United States Patent Office 2,745,745
Patented May 15, 1956

2,745,745

POULTRY FEED

Edward S. Blake, Lynnfield, and Robert J. Wineman, Concord, Mass., assignors to Monsanto Chemical Company, St. Louis, Mo., a corporation of Delaware No Drawing. Application October 30, 1952,
Serial No. 317,828

11 Claims. (Cl. 99—4)

The present invention relates to processes of preparing alpha-hydroxy aliphatic carboxylic acids containing mercapto or substituted mercapto groups, particularly alpha-hydroxy-gamma-methylmercapto butyric acid, and derivatives of such acids. The present invention also relates to novel derivatives of such acids, and to novel compositions containing alpha-hydroxy-gamma-methylmercapto butyric acid and/or novel derivatives of such acid.

It has been proposed heretofore to prepare alpha-hydroxy-gamma-methylmercapto butyric acid (but not in isolated form) by the microbiological replacement of the amino group of methionine with a hydroxyl group, or by the replacement of the amino group of methionine with a hydroxyl group by means of nitrous acid. Methionine, however, is an expensive starting material and the alpha-hydroxy-gamma-methylmercapto butyric acid prepared from methionine is thus considerably more expensive than the methionine itself. Moreover, the processes of preparing such acid from methionine are quite difficult to control, and the yield of such acid is not as high as is desired. The zinc salt of alpha-hydroxy-gamma-methylmercapto butyric acid has also been reported in the literature.

In accordance with the present invention it is possible to prepare alpha-hydroxy aliphatic carboxylic acids which contain mercapto or substituted mercapto groups, and derivatives of such acids, in good yield and economically by starting with relatively inexpensive starting materials. The resulting products are suitable as chemical intermediates and are also suitable for other uses as will be discussed is greater detail hereinafter.

In accordance with the present invention it has also presently been found that (DL) alpha-hydroxy-gamma-methylmercapto butyric acid and certain derivatives thereof are particularly valuable and suitable as additives to poultry feeds for increasing the feed efficiency of the poultry, that is, for giving lowered feed consumption for maximum gain in weight of poultry. In many instances, also, it is possible to promote the growth of poultry by incorporating such additives in poultry feeds.

It is, accordingly, one object of the present invention to provide new processes for the preparation of alpha-hydroxy aliphatic carboxylic acids containing mercapto or substituted mercapto groups, particularly alpha-hydroxy-gamma-methylmercapto butyric acid, and derivatives of such acids.

It is a further object of the present invention to provide novel derivatives of alpha-hydroxy aliphatic carboxylic acids containing mercapto or substituted mercapto groups.

It is a further object of the present invention to provide novel derivatives of alpha-hydroxy-gamma-methylmercapto butyric acid, particularly alpha-hydroxy-gamma-methylmercapto butyramide.

It is a further object of this invention to provide novel compositions suitable for use as poultry feeds, which compositions provide improved feeding efficiency and generally promote the growth of poultry.

Still further objects and advantages of the present invention will become apparent from the following description and the appended claims.

The processes of this invention are carried out, in general, by hydrolyzing a cyanohydrin having the general formula:

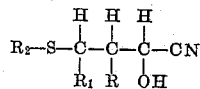

where R is hydrogen or methyl, $R_1$ is hydrogen or the methyl, phenyl or furyl radical and $R_2$ is hydrogen or an alkyl group containing 1 to 12 carbon atoms, under controlled conditions to form the corresponding amide or the free acid, depending on the conditions employed. The amide may be employed to prepare other novel derivatives of the acid. On the other hand, when the free acid is prepared by hydrolysis of the cyanohydrin, it may be recovered from the hydrolysis mixture, or various derivatives may be prepared therefrom, as will be described in greater detail hereinafter, without first isolating the free acid from the reaction mixture.

The cyanohydrins referred to immediately above may be prepared in various ways. For example, they are readily prepared by reacting hydrogen cyanide or an equivalent cyanide with an aldehyde having the general formula:

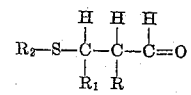

where R, $R_1$ and $R_2$ have the same significance as in the general formula for the cyanohydrin hereinbefore given, to form the corresponding cyanohydrin. The reaction between the aldehyde and the hydrogen cyanide or an equivalent cyanide may be carried out in various ways. Thus, the reaction is suitably carried out by first treating the aldehyde with an alkali metal bisulfite or metabisulfite such as sodium bisulfite or metabisulfite in water at relatively low temperatures to form the bisulfite addition product, which is water-soluble, and then reacting the resulting addition product with an alkali metal cyanide such as sodium cyanide. Since these ingredients react practically quantitatively, they are preferably employed in substantially equimolecular quantities to avoid the otherwise necessary step of purifying the cyanohydrin. The temperature is preferably maintained between about 20 and 40° C. during the reaction.

The cyanohydrin is also suitably prepared by reacting the aldehyde with anhydrous cyanide in the presence of a small amount of pyridine or some other basic amine catalyst at relatively low temperatures. In such instances the hydrogen cyanide and the aldehyde may be employed in equimolecular proportions or the hydrogen cyanide may be used in excess. The temperature is preferably maintained between about 20 and 45° C. during the reaction. Any excess hydrogen cyanide is removed as, for example, by distillation under reduced pressure. The yield of cyanohydrin is substantially quantitative.

The aldehydes employed in the preparation of the cyanohydrins are readily prepared by reacting hydrogen sulfide or sodium hydrogen sulfide, or an alkyl mercaptan containing from 1 to 12 carbon atoms such as, for example, methyl mercaptan or dodecyl mercaptan, with an ethylenically unsaturated aldehyde such as acrolein, tiglaldehyde, furfuracrolein, crotonaldehyde, or cinnamaldehyde. The reaction is substantially quantitative and the corresponding mercapto aldehyde is obtained in a very high yield and in a substantially pure state. The preferred aldehyde for use in preparing the preferred cyanohydrins and derivatives therefrom is beta-methyl-mercapto propionaldehyde which may be prepared by reacting methanethiol (also known as methyl mercaptan) with acrolein.

The cyanohydrins hereinbefore described are hydrolyzed in accordance with the process of the present invention to form the corresponding free acid or the amide of the acid, depending on the conditions employed in carrying out the hydrolysis. In any event, the amide is formed first and may then be hydrolyzed to form the free acid or the amide may be hydrolyzed directly to derivatives of the acid as will appear hereinafter. It has presently been found that when the cyanohydrin is treated with relatively concentrated solutions of a mineral acid selected from sulfuric acid or hydrochloric acid and at relatively low temperatures, that is, temperatures below about 75° C., the cyanohydrin is converted to the amide of the corresponding acid in high yields, that is, in yields of about 65 to 75%, based on the starting cyanohydrin, without any appreciable formation of the free acid.

In carrying out this embodiment of the present invention, the cyanohydrin, either in the crude or pure state, is treated or contacted with an aqueous solution of the mineral acid containing an amount of acid sufficient to dissolve the cyanohydrin at temperatures not in excess of 75° C., and preferably between about 20 and 50° C. When sulfuric acid solutions are employed, the solution preferably contains from 50 to 85% by weight of such acid. On the other hand, when hydrochloric acid solutions are used, the solution suitably contains about 25 to 40% by weight of such acid. The amount of acid solution employed may be such as to provide a molecular proportion of acid equivalent to the cyanohydrin, although a mol ratio of mineral acid to the cyanohydrin as high as 1.5:1 may be used. The ratio of the mineral acid to the cyanohydrin may be even higher than this, but there is no advantage in using more acid and the problem of removing the acid in subsequent steps is made considerably more difficult.

It has been presently found that very satisfactory hydrolysis of the cyanohydrin to the amide is unexpectedly obtained, when less than molecular equivalents of sulfuric acid and cyanohydrin are employed. Thus, it is possible to obtain high yields of the amide from the cyanohydrin even when the mol ratio of sulfuric acid to cyanohydrin is between 0.5:1 and 0.8:1. These low mol ratios of acid to cyanohydrin are particularly advantageous in those instances where the amide is hydrolyzed to the corresponding acid and thence converted to derivatives of such acid, since in such instances considerably smaller amounts of water-insoluble impurities are formed from the sulfate ions present, and appreciably larger quantities of the desired product are recovered in separating such impurities from the product desired. This is of considerable advantage in commercial production since considerable economies in separating or recovering the desired product from water-insoluble impurities are effected.

When sulfuric acid solutions are used for hydrolyzing the cyanohydrin to the amide at temperatures between about 55 and 75° C., the aqueous solution of the acid should preferably contain close to 50% by weight of sulfuric acid. On the other hand, aqueous sulfuric acid solutions which are employed at temperatures between about 20 to 50° C. preferably contain about 70 to 85% by weight of sulfuric acid.

For best results the aqueous solution of the mineral acid should be added to the cyanohydrin in small portions, either continuously or intermittently, and over a period of from about 30 to 180 minutes. However, it is possible to contact the cyanohydrin initially with all of the aqueous solution of the mineral acid if care is taken to maintain the temperature of the resulting mixture below 75° C., and preferably between about 20 and 50° C.

The hydrolysis of the cyanohydrin to the amide of the corresponding free acid is usually completed within a period of 10 to 180 minutes depending on the specific conditions used in carrying out the hydrolysis. Generally, shorter hydrolysis periods are required, for example, when the water-sulfuric acid hydrolyzing mixture contains from 70 to 85% by weight of sulfuric acid and when temperatures close to 60–75° C. are employed. However, under such conditions there is some loss in yield. Longer hydrolysis periods are required, for example, when the water-sulfuric acid hydrolyzing mixture contains about 50% by weight of sulfuric acid and temperatures of 20 to 50° C. are employed.

If desired, the amide may be separated or recovered from the hydrolysis mixture at this stage, or the amide may be converted to the corresponding free acid or to derivatives of such acid without separating the amide from the hydrolysis mixture. If it is desired to recover the amide per se, the procedure used varies depending primarily on the mineral acid employed, the concentration of the water-mineral acid mixture and the temperature of the hydrolysis mixture. Since the amide is soluble in water-sulfuric acid mixtures containing from about 70 to 85% by weight of sulfuric acid and at temperatures between about 25 and 75° C., it is usually necessary in such cases to dilute the hydrolysis mixture with water to cause separation of the amide in the form of crystals. The amount of water added may be varied considerably. Usually dilution with water until the water-sulfuric acid mixture contains from about 20 to 40% by weight of sulfuric acid or less is sufficient to cause precipitation of a considerable amount of the amide. Cooling the hydrolysis mixture to temperatures below 20° C., for example, between 5 and 15° C., also aids in the precipitation of the amide. If the hydrolysis mixture is cooled and diluted with water a substantial portion of the amide in the hydrolysis mixture is readily precipitated in the form of crystals. The crystals are readily separated from the mother liquor by filtration, centrifugation, decantation or the like.

When the hydrolysis of the cyanohydrin to the amide is carried out in a water-sulfuric acid mixture containing about 50% by weight of sulfuric acid, it is not essential to dilute the mixture with water since some of the amide will precipitate on cooling the solution below the operating temperature. However, in order to precipitate a substantial portion of the amide from solution both dilution with water and cooling are essential.

In order to separate the amide which remains in solution in the mother liquor, the mother liquor may be treated with a metallic base or salt which is capable of forming a water-insoluble salt with the anion of the hydrolyzing mineral acid in the liquor. For example, when the hydrolyzing acid is sulfuric acid, calcium carbonate or calcium hydroxide or any of the alkali earth metal carbonates or hydroxides are useful for the purpose of forming the corresponding water-insoluble alkali earth metal sulfate in the mother liquor. The water-insoluble sulfate is removed by filtration or in any convenient manner. The mother liquor is next concentrated and the residue is taken up in a suitable solvent and the amide therein is crystallized from the resulting solution. For example, in the case of alpha-hydroxy-gamma-methylmercapto butyramide, the residue may be taken up in hot acetone and the amide crystallized therefrom. The amides generally crystallize from water and are generally soluble in hot acetone.

The amides produced in accordance with the procedure described above are new chemical compounds and have the general formula:

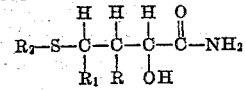

where R, R₁ and R₂ have the same significance as in the general formula for the cyanohydrin hereinbefore given. The (DL) form of the amide is obtained as a result of the processes described herein.

The amide may be hydrolyzed to the corresponding free acid or directly to derivatives of such acid as has been pointed out above. In those instances where the free acid or certain derivatives thereof are desired, it is preferred to first form the amide from the cyanohydrin as hereinbefore described. For example, after the amide has been formed from the cyanohydrin by the use of relatively concentrated aqueous sulfuric or hydrochloric acid solutions and relatively low temperatures, as hereinbefore described, the hydrolysis mixture is diluted with water until the mixture contains from about 5 to 40% by weight, preferably between about 10 and 20% by weight, of the hydrolyzing acid. The dilution water is desirably added to the hydrolysis mixture containing the amide at a rate sufficient to maintain the temperature of the mixture below about 75° C., and preferably between 20 and 50° C. The temperature of the mixture is then raised above 60° C., and preferably from 80° C. to the boiling point of the mixture at atmospheric pressure, for a period of time sufficient to complete the hydrolysis of the amide to the corresponding free acid. This usually requires from about 30 minutes to about 5 hours depending primarily on the concentration of the acid in the hydrolysis mixture and the temperature of the mixture. If desired, heating of the hydrolysis mixture may be started while the dilution water is being added if care is taken to maintain the mixture below 75° C. until dilution of the original amide-hydrolyzing acid mixture is complete.

In order to obtain a relatively pure hydrolysis product, it is desirable to distill off some of the water present in the hydrolysis mixture during the hydrolysis of the amide to the corresponding free acid. In this manner some of the impurities which are steam distillable, including hydrogen cyanide, are removed from the hydrolysis mixture. Satisfactory results are obtained in this respect by distilling off about 5 to 15% by weight of the water calculated on the weight of the hydrolysis mixture. The time required for carrying out the removal of water in this manner varies to some extent depending on the volume of liquid present and the heat transfer surface available, but is usually between about 30 and 90 minutes.

The mixture obtained by the hydrolysis step described above contains the free acid (hereinafter sometimes referred to as the substituted butyric acid), that is, a compound having the general formula:

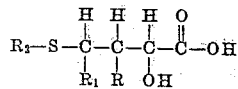

where R, R₁ and R₂ have the same significance as in the general formula for the cyanohydrin hereinbefore given; and also contains the ammonium salt of the hydrolyzing acid, for example, ammonium sulfate or ammonium chloride, and minor amounts of impurities. The substituted butyric acid is obtained as the (DL) form and may be separated from the mixture by extraction with a suitable water-immiscible organic liquid which is a solvent for the acid, for example, an organic liquid such as diethyl ether. The organic liquid may then be separated by evaporation or distillation and the acid is recovered as a substantially pure product.

Various derivatives of the substituted butyric acid may be made from the hydrolysis mixture containing such acid, or from the acid per se. For example, it is possible to prepare a solution of the ammonium salt of the acid by adding an alkali earth metal hydroxide or carbonate, such as calcium hydroxide or carbonate, to the hydrolysis mixture in an amount sufficient to react with the ammonium sulfate in the mixture (when sulfuric acid is used as the hydrolyzing acid) to form insoluble calcium sulfate and thus liberate ammonia which then reacts with the substituted butyric acid to form the salt. The alkali earth metal sulfate is then removed from the solution by filtration or some equivalent operation. It is preferred, however, to dilute the hydrolysis mixture with water until it contains between about 3 and 8% by weight of the hydrolyzing acid prior to the addition of the alkali earth metal hydroxide or carbonate. Moreover, it is also preferred to heat the hydrolysis mixture to a temperature of about 45 to 65° C. prior to the addition of such hydroxide or carbonate. Normally, the pH of the mixture after the addition of the required amount of hydroxide or carbonate will be between about 5.4 and 5.9. After removal of the insoluble alkali earth metal sulfate from the hydrolysis mixture, the water may be removed from the mixture by evaporation, leaving a residue which consists substantially of the ammonium salt. A purer ammonium salt may be prepared by reacting the substituted butyric acid per se with ammonia or ammonium hydroxide. In general, the ammonium salts of the substituted butyric acids described herein are obtained as viscous liquids or hygroscopic solids depending on the temperature and the amount of water contained therein.

By adding an excess of the alkali earth metal hydroxide or carbonate to the hydrolysis mixture it is possible to form a mixture of ammonium and alkali earth metal salts of the substituted butyric acid, or the alkali earth metal salt of the acid depending on the quantity of such hydroxide or carbonate used. In carrying out this procedure it is preferred to employ calcium hydroxide since the only by-products present in the final mixture are calcium hydroxide and ammonium hydroxide. The calcium hydroxide, being only slightly water-soluble, may be removed by filtration or in some equivalent manner, while the ammonium hydroxide may be decomposed to ammonia and water by heating the mixture, thus driving off the ammonia as a gas. The final mixture thus consists substantially of a mixture of ammonium and calcium salts of the substituted butyric acid, or the calcium salt of the acid. The salts may then be recovered by evaporating off the water. Before adding the excess of alkali metal hydroxide or carbonate, it is preferred to heat the solution containing the ammonium salt of the substituted butyric acid to a temperature of about 45 to 65° C., and after such hydroxide or carbonate has been added it is preferred to heat the solution or mixture to a temperature of about 90° C. to the boiling point to drive off the ammonia present in the solution.

The mixtures of ammonium and alkali earth metal salts of the substituted butyric acid may also be prepared by reacting the ammonium salt of the acid per se with an amount of alkali earth metal hydroxide which is insufficient to form the alkali earth metal salt per se. The ammonium hydroxide formed may then be removed as described above. The alkali earth metal salt of the substituted butyric acid may be prepared by reacting either the acid per se or the ammonium salt of the acid with an alkali earth metal hydroxide using an amount of hydroxide in excess of the stoichiometric quantity.

The ammonium and alkali earth metal salts of the substituted butyric acid, or mixtures of such salts, are new compounds. These salts and the amide may be represented by the general formula:

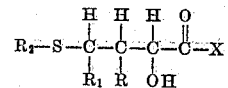

where X is selected from —NH₂, —ONH₄, —O-alkali earth metal —OH or —O— alkali earth metal

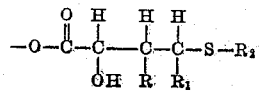

radicals, or is a mixture of the last three radicals, and R, R₁ and R₂ have the same significance as in the formula of the cyanohydrin hereinbefore given.

Various derivatives of the substituted butyric acid may be prepared without conducting the cyanohydrin hydrolysis to the free acid stage. For example, it is possible to hydrolyze the amide in the hydrolysis mixture by means of a basic compound, preferably an alkali earth metal hydroxide such as calcium hydroxide, using an amount of hydroxide sufficient to react with all of the hydrolyzing mineral acid to form, for example, the corresponding alkali earth metal sulfate or chloride, and also sufficient to hydrolyze the amide to the akali earth metal salts of the acid, or to the ammonium salt of the acid or to a mixture of such salts.

The hydrolysis of the cyanohydrin to the amide or the the free acid stage may be carried out in the presence of an inert organic liquid such as carbon tetrachloride. However, it is preferred to carry out the hydrolysis in an aqueous medium for ease of control and for purpose of economy.

The amides, the substituted butyric acids and the novel salts of such acids, described herein, may be used for a variety of purposes. Thus, they may be used as chemical intermediates in chemical synthesis, as synergistic agents for food anti-oxidants and as powdered egg preservatives.

It has presently been found that alpha-hydroxy-gamma-methylmercapto butyramide, alpha-hydroxy-gamma-methylmercapto butyric acid and the ammonium or alkali earth metal salts of such acid, or mixtures of such salts, particularly the calcium salts or mixtures of the ammonium and calcium salts, improve the efficiency of feed utilization by poultry when incorporated in poultry feeds or rations, particularly poultry feeds or rations which are deficient in free methionine, and, in most instances, the growth of poultry will also be promoted. The amount of such compounds used or required in the poultry feed varies appreciably depending primarily on the particular poultry feed composition used and the species of poultry, but is generally small and ordinarily below about 0.5% by weight, based on the feed composition.

For example, in the case of poultry feeds containing peanut meal as the primary protein source, an improvement in the growth and feed-efficiency of the poultry is obtained when such compounds are added at levels of about 0.1 to 0.5% by weight of the feed or ration. However, if the peanut meal is replaced by a more nutritionally complete protein or a more nutritionally complete mixture of proteins, a significant improvement in feed efficiency of the poultry is still obtained by supplementing the feed or ration with such compounds at lower levels as, for example, from about 0.005 to 0.15% by weight of the feed or ration. The optimum supplementary levels of such compounds is determined in part by the source of protein in the feed or ration. In many instances, such supplementation of the feed or ration results in improved growth of the poultry in addition to an improvement in feed efficiency.

From the foregoing, it is seen that the supplementary compounds of this invention are normally added to the poultry feed or ration in amounts of 0.005 to 0.5% by weight, based on the feed or ration, and that the amounts employed within this range are dependent on the particular poultry feed compositions used. In most cases when commercial poultry feeds or rations are employed, it is possible to obtain satisfactory results when from about 0.01 to 0.15% of the supplementary compounds of this invention are added, and such amounts are preferred.

A further understanding of the processes, chemical compounds and compositions of this invention will be obtained from the following specific examples which are intended to illustrate the present invention but are not intended to limit the scope of the invention, parts and percentages being by weight unless otherwise specified.

*Example I*

A. Preparation of alpha-hydroxy-gamma-methylmercapto butyronitrile:

One hundred and sixty-six and four tenths grams of beta-methylmercapto propionaldehyde were placed in a flask and shaken for 10 minutes with a solution of 152 grams of sodium meta bisulfite in 576 milliters of water. The temperature of this mixture was maintained below 35° C. Seventy-eight and four tenths grams of sodium cyanide were added in portions to the solution and the temperature was maintained between 25 and 35° C. during this addition. An oil phase separated out as an upper layer and this was separated from the lower aqueous layer. The aqueous layer was then extracted with benzene and the resulting benzene extracts were combined with the separated oil layer. The benzene-oil solution was dried over anhydrous sodium sulfate, and subjected to vacuum distillation at a heating bath temperature of 40° C. to remove the benzene. The residue totaled 200.4 grams. The yield of alpha-hydroxy-gamma-methylmercapto butyronitrile was 95% based on the starting beta-methylmercapto propionaldehyde.

B. Preparation of alpha-hydroxy-gamma-methylmercapto butyramide:

One hundred and ninety-nine grams of the crude nitrile prepared as described immediately above were placed in a flask and to this mixture of 27 grams of water and 152 grams of 98% sulfuric acid was added dropwise and with stirring. The temperature was maintained at about 35° C. during this addition. After all of the acid and water mixture was added, the mixture was agitated for 10 minutes, after which 316 milliliters of water were added to the mixture as rapidly as possible consistent with keeping the temperature below 35° C. After all of this water was added, the resulting solution was cooled to a temperature of 5 to 10° C. whereupon the amide crystallized in the form of colorless nacreous plates. The resulting mixture was filtered to remove the crystals. The crystals were washed with 100 parts of water, dried at room temperature under vacuum and then dried at about 65° C. One hundred and eleven parts of dry crystals were thus obtained. The crystals melted at 98 to 100° C.

The filtrate obtained after removal of the crystals was diluted with 316 milliliters of water and neutralized by the addition of 160 grams of calcium carbonate with stirring. The calcium carbonate reacted with the sulfuric acid in the filtrate to form $CaSO_4$ which precipitated from the solution and was removed together with excess calcium carbonate by filtration. The filtrate was concentrated under vacuum at a heating bath temperature of 35° C. to a weight of 150 grams. This concentrated liquid was next taken up in 300 milliliters of boiling acetone, filtered hot and then allowed to cool. On cooling the amide crystallized and was separated by filtration and dried. Thirty-three and eight tenths grams of the product were thus obtained. The dry crystals melted at a temperature of 97 to 100° C. A third crop of 10 grams of crystals were obtained in the same manner by further evaporation of the acetone solution. The total yield of product, which on analysis proved to be the alpha-hydroxy-gamma-methylmercapto-butyramide, was 155 grams. This represents a yield of 68% based on the starting beta methylmercapto propionaldehyde.

*Example II*

A. Preparation of alpha-hydroxy-gamma-methylmercapto butyronitrile:

One hundred and fifty-six and seven tenths grams of beta-methylmercapto propionaldehyde and 0.45 gram of pyridine (as a catalyst) were placed in a flask and 45 grams of liquid hydrogen cyanide (96% pure) were added dropwise to the flask over a period of one hour with stirring. The temperature of the ingredients in the flask was maintained between 30 and 40° C. during this addition. After all of the hydrogen cyanide was added, the mixture was stirred for one hour at atmospheric pressure and room temperature. Vacuum was then applied to the flask until all of the excess hydrogen cyanide was removed.

B. Preparation of alpha-hydroxy-gamma-methylmercapto butyramide:

A mixture of 162 grams of 98% sulfuric acid and 53.7 grams of water was added to the nitrile, prepared as described immediately above, over a period of 2 hours and the temperature of the resulting mixture was maintained between 30 and 35° C. The mixture was stirred for 10 minutes, after which 323 grams of water were added over a period of about 5 minutes with stirring. This mixture was divided into two portions, one of which weighed 362.5 grams. This latter portion was cooled in an ice water bath and the amide therein was allowed to crystallize. The amide crystallized in the form of colorless, nacreous plates which were separated from the mother liquor by filtration and washed with 50 milliliters of water to give 77 grams of damp cake. The damp cake was first dried at room temperature under vacuum and then dried at 65° C. to a constant weight of 86.4 grams. The dry crystals melted at 95 to 98° C.

The filtrate from the above procedure was treated with 100 milliliters of water and then with 88 grams of calcium carbonate with rapid stirring, the carbonate being added in portions so that the temperature of the mixture was maintained below 35° C. The precipitated calcium sulfate and excess calcium carbonate were filtered off and the cake was washed with 100 milliliters of water. The filtrate and washings were combined and concentrated under a vacuum at a heating bath temperature of 40° to a weight of 53 grams. This residue was taken up in 100 milliliters of hot acetone, filtered to remove inorganic matter, and the filtrate was allowed to evaporate to a volume of 30 milliliters. The crystals which formed were filtered off, washed with cold acetone and dried to give 11.7 grams of less pure product. The total yield of (DL) alpha-hydroxy-gamma-methylmercapto butyramide was 80.1 grams, which is a 73% yield based on the starting beta-methylmercapto propionaldehyde. On recrystallization from hot acetone, the amide melted at 97 to 98.5° C. Calculated on the basis of the formula $C_5H_{11}O_2NS$; C=40.25%, H=7.73%, N=9.39%, S=21.49% and O=21.16%. Found by analysis; C=40.25%, H=7.47%, N=9.4%, S=21.39% and O=21.47% (by difference).

The remaining 373.8 grams of hydrolysis mixture were converted to the mixed calcium and ammonium salts of alpha-hydroxy-gamma-methylmercapto butyric acid as described in the following example.

*Example III*

Alpha - hydroxy - gamma - methylmercapto butyronitrile was prepared from 104.2 grams of beta-methylmercapto propionaldehyde using the procedure described in the first paragraph of Example II. After all of the excess hydrogen cyanide was removed from the reaction mixture, a mixture of 110 grams of 98% sulfuric acid and 36 grams of water were added dropwise to the mixture over a period of 1.5 hours with stirring and at a temperature of 30 to 35° C. The mixture was stirred for 10 minutes, after which 514 milliliters of water were added over a period of 3 to 4 minutes. The temperature of the mixture was raised to the boiling point over a period of 40 minutes, after which the mixture was refluxed (about 100° C.) with stirring for 1 hour. The resulting mixture consisted primarily of alpha-hydroxy-gamma-methylmercapto butyric acid, water and ammonium sulfate. After cooling, the 798 grams of reaction mixture was divided into two equal portions (designated A and B) of 399 grams each.

Portion A was diluted with 600 milliliters of water and the sulfuric acid therein was neutralized by the addition of a slurry of 40.8 grams of calcium hydroxide in 250 milliliters of water over a period of 1.5 hours. The mixture was stirred for 45 minutes and the calcium sulfate which had precipitated was removed by filtration and washed with 140 milliliters of water. The combined filtrate and washings (totaling 1266 grams) were then added to a stirred slurry of 18.5 grams of calcium hydroxide in 250 milliliters of water. The mixture was next stirred for 11.5 hours and the suspended material, which was largely calcium sulfate, was removed by filtration. The filtrate was concentrated to dryness under vacuum at a heating bath temperature of 40 to 45° C. A cream colored solid was recovered which was then dried further, ground and screened. The yield of product was 87 grams. Analyses for sulfide sulfur, ammonia nitrogen, calcium and water indicated that the composition of this material is 26.1% ammonium salt of (DL) alpha-hydroxy-gamma-methylmercapto butyric acid, 66.6% of the calcium salt of the same acid, 3.72% water and 3.2% calcium sulfate. The percent yield of total salts of alpha-hydroxy-gamma-methylmercapto butyric acid calculated on the sulfide sulfur analysis is 95.4% based on the starting beta-methylmercapto-propionaldehyde.

Portion B of the filtrate was diluted with 600 milliliters of water and the sulfuric acid in the mixture was neutralized by adding, with stirring, a suspension of 55 grams of calcium carbonate in 250 milliliters of water. The precipitated calcium sulfate was filtered off and the filter cake was washed with 140 milliliters of water. The combined filtrate and washings were stirred and a suspension of 18.5 grams of calcium hydroxide in 250 milliliters was added thereto. After stirring for 16 hours, the suspended material (which was largely calcium sulfate) was filtered off and the filtrate was concentrated to dryness to give 91.5 grams of a cream colored product. An analysis indicated that this product consisted of 67% of the calcium salt of alpha-hydroxy-gamma-methylmercapto butyric acid, 22% of the ammonium salt of the same acid, 7.1% water and 3.4% calcium sulfate. The yield of total salts of the butyric acid was 96.4% based on the starting beta-methylmercapto propionaldehyde.

*Example IV*

Crude alpha-hydroxy-gamma-methylmercapto butyric nitrile was first prepared from 104.0 grams of beta-methylmercapto propionaldehyde using the procedure described in the first paragraph of Example II, and then hydrolyzed to the corresponding amide by the dropwise addition of a mixture of 36 grams of water and 110 grams of 98% sulfuric acid over a period of 2 hours at a temperature of 20 to 25° C. Five hundred and fourteen milliliters of water were added to the resulting solution with stirring and the whole was heated for 1 hour under reflux (about 100° C.) to form the corresponding free acid. The mixture was diluted with 1200 milliliters of water, after which a suspension of 126 grams of calcium hydroxide in 400 milliliters of water was added over a period of 30 minutes. The mixture was stirred for 4 hours, diluted with 210 milliliters of water and then stirred for 16 hours under a partial vacuum of about 12 to 21 inches of mercury, to assist in the removal of liberated ammonia. The insoluble material was filtered off and then repulped in 425 milliliters of water. The precipitated matter, which consisted primarily of calcium sulfate, was removed by filtration and then washed with 115 milliliters of water. The filtrates and washings were combined and evaporated to dryness under vacuum at a heating bath temperature of 35 to 40° C. This product was then air dried to give 177 grams of a practically colorless material. An analysis of this material indicated a composition of 60.5% calcium salt of alpha-hydroxy-gamma-methylmercapto butyric acid, 25.6% ammonium salt of the same acid, 4.8% calcium sulfate and 7.7% water. The yield was about 90.2% based on the starting beta-methylmercapto propionaldehyde.

A portion of the mixed ammonium and calcium salts, prepared as described immediately above, was treated with an equivalent of sulfuric acid in water. After removal of the precipitated calcium sulfate by filtration, the filtrate was treated with a saturated solution of zinc acetate. Colorless crystals of the zinc salt of alpha-hydroxy-gamma-methylmercapto butyric acid formed in the solution and these were filtered off and dried on a porous plate. The crystals melted at a temperature of 250 to 256° C. with decomposition. Reported melting point of the zinc salt is 250° C.

Example V

Five grams of alpha-hydroxy-gamma-methylmercapto butyronitrile were treated with 5 milliliters of concentrated hydrochloric acid (specific gravity 1.18) and the mixture was cooled sufficiently to maintain the temperature below 40° C. The mixture was then allowed to stand for 60 hours at room temperature. During this period crystals of ammonium chloride formed and the crystals were separated from the mother liquor by filtration. The filtrate was extracted with diethyl ether, and the ether layer thus obtained was allowed to stand until substantially all of the ether therein had evaporated. An oily liquid in the amount of 5.8 grams was obtained. When this oily liquid was treated with a saturated aqueous solution of zinc acetate, colorless crystals of the zinc salt of (DL) alpha-hydroxy-gamma-methylmercapto butyric acid were deposited. After these crystals were removed and dried, they melted at 252 to 256° C. with decomposition. The reported melting point of the zinc salt is 250° C.

Example VI

A. Preparation of alpha-hydroxy-gamma-methylmercapto butyric acid.

One hundred and thirty one grams of alpha-hydroxy-gamma-methylmercapto butyronitrile were charged to a glass lined vessel and 72 grams of an aqueous sulfuric acid solution containing 75% $H_2SO_4$ were added slowly with stirring over a period of 30 minutes, while maintaining the resulting mixture between 30 and 50° C. The amount of acid thus supplied was about 0.55 mol per mol of the nitrile. Stirring was continued for about 15 minutes after all of the acid solution was added, during which time substantially all of the nitrile was hydrolyzed to alpha-hydroxy-gamma-methylmercapto butyramide, and then sufficient water was added to provide a mixture containing about 14.2% of sulfuric acid while maintaining the temperature at 50° C. After all of the water was added the mixture was heated to the boiling temperature of the mixture (about 106° C.) at atmospheric pressure and water was distilled off from the mixture at a rate such as to remove 11% of the water from the mixture over a period of 60 minutes. During this operation the amide in the mixture was hydrolyzed to the corresponding acid (alpha-hydroxy-gamma-methylmercapto butyric acid) and ammonium sulfate was also formed, and the steam distillable impurities, including hydrogen cyanide, were removed from the mixture during the distillation of the water. The hydrolysis mixture was then cooled down to about 20 to 30° C. At this stage the mixture contained about 15 to 16% of sulfuric acid, and the mixture was then diluted with water until it contained about 5.7% sulfuric acid.

B. Preparation of calcium salt of alpha-hydroxy-gamma-methylmercapto butyric acid.

The mixture obtained as a result of the procedure of the preceding paragraph was heated to a temperature of about 55° C. and calcium carbonate was then added in an amount sufficient to react with all of the ammonium sulfate in the mixture. As a result of this procedure the ammonium salt of the alpha-hydroxy-gamma-methylmercapto butyric acid was formed together with calcium sulfate. The pH of the mixture at this stage was about 5.5. The insoluble calcium sulfate was then separated from the liquid by centrifugation and the cake of calcium sulfate thus obtained was washed to remove the ammonium salt of the acid occluded therein. The washings were combined with the liquid obtained by centrifugation and the resulting mixture was then heated to 55° C., after which calcium hydroxide was added in an amount sufficient to form the calcium salt of the butyric acid plus a slight excess. By this procedure the calcium salt of alpha-hydroxy-gamma-methylmercapto butyric acid and ammonium hydroxide were formed. The mixture was then heated to 95° C. for about 60 minutes to decompose the ammonium hydroxide and to drive off ammonia. The resulting mixture was then diluted with water until it contained about 10% by weight of such calcium salt and was then filtered to remove residual calcium sulfate and calcium hydroxide. The resulting solution was then concentrated by evaporation of water until a concentrated slurry of the calcium salt of the butyric acid was obtained. This slurry was then filtered and the filter cake, which consisted substantially of the calcium salt, was dried. The mother liquor was combined with subsequent slurries of the calcium salt. The composition of the dry cake was as follows: 97% calcium salt of (DL) alpha-hydroxy-gamma-methylmercapto butyric acid, about 1.5% of the ammonium salt of the same acid, about 1% of water and the balance essentially calcium sulfate.

Example VII

The alpha-hydroxy-gamma-methylmercapto butyramide, hereinafter referred to as the amide, as prepared in Example II, and the mixture of ammonium and calcium salts of alpha-hydroxy-gamma-methylmercapto butyric acid, hereinafter referred to as the mixed salt, as prepared in the last paragraph of Example III, were added to a basal poultry diet for the purpose of promoting the growth of chicks according to the following procedure and with the following results:

The chicks at hatching were placed in an electrically-heated metal battery brooder equipped with raised wire screen floors. They were fed a normal chick starter ration until they were two weeks of age. At this time the chicks were wing banded, weighed and segregated into experimental groups on the basis of weight and vigor. Feed and water were fed ad libitum.

Ten chicks (two weeks of age) were fed with the following basal diet for a period of 20 days:

| | Grams |
|---|---|
| Peanut meal | 43.86 |
| Calcium gluconate | 5.0 |
| Dicalcium phosphate | 2.52 |
| Calcium carbonate | 0.75 |
| Choline chloride | 0.065 |
| Cellulose (celluflour) | 4.0 |
| Magnesium sulfate | 0.4 |
| Sodium silicate | 0.2 |
| Salt mixture [1] | 0.5 |
| Soybean oil | 3.0 |
| Fish oil | 0.25 |
| Cholic acid | 0.1 |
| L-lysine | 0.4 |
| Glucose (cerelose) | 38.955 |

[1] The salt mixture added the following levels of minerals to the diet: 0.49% manganese, 0.1% copper, 0.05% zinc, 0.05% aluminum, 0.002% cobalt and 0.04% iodine.

Each 100 grams of the above basal diet contained the following vitamin levels added at the expense of cerelose:

| | Milligrams |
|---|---|
| Niacin | 5.5 |
| Vitamin E | 1.0 |
| Biotin | 0.01 |
| Thiamine hydrochloride | 1.0 |
| Riboflavin | 1.0 |
| Pyridoxine | 1.0 |
| D-calcium pantophenate | 2.0 |
| Vitamin K (menadione) | 2.0 |
| Folic acid | 0.2 |

The chicks were weighed individually at the start of the test and at the end of 3, 5, 7, 10, 14, 17 and 20 days, and the average weight of the chicks at each period of time was calculated.

Ten chicks (two weeks old) were fed in the same manner with the basal diet described above to which had been added 0.2%, on the total feed, of the (DL) alpha-hydroxy-gamma-methylmercapto butyramide.

Ten chicks (two weeks old) were fed in the same manner with the basal diet described above to which had been added 0.2%, on the total feed, of the mixed ammonium and calcium salts of (DL) alpha-hydroxy-gamma-methylmercapto butyric acid.

The following table shows the average individual weights in grams of each group of chicks at the start of the test and after 3, 7, 14, 17 and 20 days of the feeding experiment:

| Feed Used | 0 | 3 | 7 | 14 | 17 | 20 |
|---|---|---|---|---|---|---|
| Basal diet | 93.2 | 97.2 | 112.0 | 157.4 | 175.4 | 195.4 |
| Basal diet+0.2% of the amide | 94.3 | 100.7 | 131.6 | 202.9 | 255.3 | 281.3 |
| Basal diet+0.2% of the mixed salt | 94.8 | 103.1 | 123.5 | 192.3 | 208.6 | 250.0 |

*Example VIII*

The same feeding tests were carried out as described in Example VII using the same diet described therein, with the exception that the amide and mixed salt in the diet were employed at levels of 0.1, 0.2, 0.3 and 0.4% and 0.13, 0.26, 0.39 and 0.52%, respectively, based on the weight of the feed composition, and a group of 10 chicks were fed with a diet containing each level of the amide or mixed salt. The chicks used were Rhode Island Red chicks and the diet and water were fed ad libitum. The following table shows the average weight and feed efficiency of each group of 10 chicks with the diet employed.

| Feed Used | Weight gain in grams for 21 days | Feed Efficiency [1] (For 21 Days) |
|---|---|---|
| Basal Diet | 125.9 | 2.31 |
| Basal Diet + 0.1% amide | 227.5 | 2.20 |
| Basal Diet + 0.2% amide | 249.6 | 1.95 |
| Basal Diet + 0.3% amide | 289.3 | 2.03 |
| Basal Diet + 0.4% amide | 291.8 | 2.07 |
| Basal Diet + 0.13% mixed salt | 270.5 | 1.92 |
| Basal Diet + 0.26% mixed salt | 291.1 | 1.86 |
| Basal Diet + 0.39% mixed salt | 299.6 | 1.70 |
| Basal Diet + 0.52% mixed salt | 286.4 | 1.77 |

[1] Feed efficiency=total weight of feed consumed during the 21 day period of the test divided by average weight gain during the period.

Although the amide and mixed salt were employed at different weight levels they were actually present in the diet on an equivalent basis at each level. The above table indicates that in each case the addition of the amide or the mixed salt to the basal diet gave increased growth, and also improved efficiency of feed utilization, that is, lower feed consumption per weight gain of chicken.

*Example IX*

The same feeding tests were carried out as described in Example VII using the same diet described therein, with the exceptions that 20 chicks were used in each group and the additives employed were the amide, the free acid (alpha-hydroxy-gamma-methylmercapto butyric acid) as a 66% and 75% aqueous solution, the ammonium salt of the acid, and the mixed salt. All of these additives were added on an equivalent basis although the weight levels in the diet varied due to the differences in molecular weight of the additives. The chicks used were sexed New Hampshire chicks and the ratio of males to females was the same in each lot. The diet and water were fed ad libitum. The following table shows the average weight and feed efficiency of each group of 20 chicks with the diet employed.

| Feed Used | Weight gain in grams for 21 days | Feed Efficiency [1] (For 21 Days) |
|---|---|---|
| Basal Diet | 117.3 | 3.83 |
| Basal Diet + 0.37% mixed salt | 234.0 | 2.60 |
| Basal Diet + 0.3% amide | 219.6 | 2.89 |
| Basal Diet + 0.46% ammonium salt | 218.7 | 2.75 |
| Basal Diet + 0.46% of 66% aqueous solution of free acid | 237.9 | 2.76 |
| Basal Diet + 0.40% of 75% aqueous solution of free acid | 236.6 | 2.57 |

[1] Feed efficiency=total weight of feed consumed during the 21 day period divided by the average weight gain during this period.

The above table indicates that in each case the addition of the amide, the free acid, the ammonium salt or the mixed salt to the basal diet gave increased growth, and also improved the efficiency of feed utilization.

*Example X*

Feeding tests were carried out using an all vegetable broiler basal ration which consisted of the following ingredients:

| Ingredient | | Amount |
|---|---|---|
| Alfalfa leaf meal | percent | 2.0 |
| Yellow corn meal | do | 44.5 |
| Corn gluten meal | do | 5.0 |
| Corn distillers dried solubles | do | 0.15 |
| Vitamin $B_{12}$ and antibiotic supplement | do | 0.25 |
| Pulverized oats | do | 5.0 |
| Soybean oil meal | do | 23.875 |
| Ground wheat | do | 5.0 |
| Wheat, standard midlings | do | 5.0 |
| Calcium carbonate | do | 1.75 |
| Choline chloride | do | 0.025 |
| Dicalcium phosphate | do | 2.0 |
| Iodized salt | do | 0.25 |
| Manganese sulfate | do | 0.025 |
| Vitamin A and D feeding oil | do | 0.1 |
| Soybean meal carrier containing 25% nitrophenide | percent | 0.05 |
| Niacin mixture (10% niacin) | do | 0.025 |
| Potassium iodide | grams per ton | 7 |
| D sterol | do | 2.3 |
| D-alpha tocopherol acetate | do | 3.5 |

In these tests groups of 16 to 20 Rhode Island Red chicks were removed from the hatcher when they were one day old and segregated into experimental groups on the basis of weight. They were brooded in electrically-heated metal battery brooders equipped with raised wire screen floors. Heat was supplied for the first three weeks. At six weeks of age, the chicks were transferred from the brooder batteries into larger growing batteries and these chickens were kept in these larger batteries for an additional 6 weeks period. Results reported below are average values for the period from hatching to ten weeks of age.

The groups were fed the basal ration or the basal ration containing supplements as indicated on the following table. Feed and water were fed ad libitum.

| Feed Used | Weight gain in pounds | Feed Efficiency [1] |
|---|---|---|
| All vegetable basal ration | 2.42 | 3.53 |
| Basal ration + 0.06% of the amide | 2.39 | 3.21 |
| Basal ration + 0.12% of the amide | 3.49 | 3.17 |
| Basal ration + 0.20% of the amide | 2.50 | 3.10 |
| Basal ration + 0.074% of the mixed salts | 2.54 | 3.11 |
| Basal ration + 0.147% of the mixed salts | 2.63 | 3.50 |

[1] Feed efficiency=total weight of feed consumed in pounds divided by the average weight gain of the chicks in pounds.

The above table indicates that in each case where the amide or mixture of ammonium and calcium salts were added to the all vegetable basal ration an improvement in the efficiency of feed utilization was obtained as compared to the feed efficiency obtained with the basal ration. Moreover, in all cases, with one exception, an improvement in growth was also obtained. Further, the mixture of ammonium and calcium salts generally gives better growth improvement and more efficient feed utilization than the amide at equivalent levels, particularly at levels below 0.15%, as will be seen from the above table and the table in Example VIII.

*Example XI*

Feeding tests were carried out according to the procedure of Example X, with the exceptions that the level of amide or mixed salt was different and the basal ration was a fish meal ration which contained the following ingredients:

| Ingredient | | Amount |
|---|---|---|
| Alfalfa leaf meal | percent | 2.0 |
| Yellow corn meal | do | 55.5 |
| Corn gluten meal | do | 5.0 |
| Corn distillers dried solubles | do | 5.0 |
| Dried grain fermentation solubles | do | 0.15 |
| Vitamin $B_{12}$ and antibiotic supplement | do | 0.25 |
| Fish meal | do | 5.0 |
| Soybean oil meal | do | 18.625 |
| Ground wheat | do | 5.0 |
| Calcium carbonate | do | 1.75 |
| Choline chloride | do | 0.025 |
| Dicalcium phosphate | do | 1.25 |
| Iodized salt | do | 0.025 |
| Manganese sulfate | do | 0.1 |
| Vitamin A and D feeding oil | do | 0.1 |
| Soybean meal carrier containing 25% of introphenide | percent | 0.05 |
| Niacin mixture 10% | do | 0.025 |
| Potassium iodide | grams/ton | 7 |
| D-sterol | do | 2.3 |
| D-alpha tocopherol acetate | do | 3.5 |

One group of chicks were fed the basal ration. Other groups of chicks were fed the basal ration containing 0.053%, 0.106% and 0.15%, respectively, of the amide, and 0.069% and 0.138%, respectively, of the mixture of ammonium and calcium salts. The following table shows the average weight gain and feed efficiency over a 10 week period for each group of chicks with the diet employed.

| Feed Used | Average weight gain in pounds | Feed Efficiency [1] |
|---|---|---|
| Basal fish meal ration | 2.45 | 3.33 |
| Basal ration + 0.053% amide | 2.56 | 2.94 |
| Basal ration + 0.106% amide | 2.57 | 2.99 |
| Basal ration + 0.15% amide | 2.52 | 3.26 |
| Basal ration + 0.069% mixed salts | 2.56 | 3.21 |
| Basal ration + 0.138% mixed salts | 2.68 | 2.97 |

[1] Feed efficiency = total weight of feed consumed in pounds divided by the average weight gain in pounds.

The results in the above table indicate, as in the case of the results of Examples VII to X, that the addition of the amide or mixture of ammonium salts to the basal ration gives improved utilization of feed as compared to the basal ration. Moreover, the growth of the chicks is promoted.

Various changes and modifications may be made in the processes, chemical compounds and compositions described herein as will be apparent to those skilled in the art to which this invention appertains without departing from the spirit and intent of the present invention. It is to be understood, therefore, that the present invention is not intended to be limited except by the scope of the appended claims.

This application is a continuation-in-part of our copending application, Serial No. 193,276, filed October 31, 1950, which is now abandoned.

What is claimed is:

1. A poultry feed composition comprising a poultry feed and a compound selected from the group consisting of alpha-hydroxy-gamma - methylmercaptobutyric acid, the ammonium salt of said acid, an alkali earth metal salt of said acid, mixtures of said salts, and alpha-hydroxy-gamma-methylmercaptobutyramide, said compound being present in an amount sufficient to improve the efficiency of feed utilization of said feed by poultry.

2. A poultry feed composition comprising from about 0.01 to 0.15% by weight, based on the composition, of alpha-hydroxy-gamma-methylmercaptobutyric acid.

3. A poultry feed composition comprising from about 0.01 to 0.15% by weight, based on the composition, of the ammonium salt of alpha-hydroxy-gamma methylmercaptobutyric acid.

4. A poultry feed composition comprising from about 0.01 to 0.15% by weight, based on the composition, of the calcium salt of alpha-hydroxy-gamma-methylmercaptobutyric acid.

5. A poultry feed composition comprising from about 0.01 to 0.15% by weight, based on the composition, of a mixture of ammonium and calcium salts of alpha-hydroxy-gamma-methylmercaptobutyric acid.

6. A poultry feed composition comprising from about 0.01 to 0.15% by weight, based on the composition, of alpha-hydroxy-gamma-methylmercaptobutyramide.

7. The poultry feed composition defined by claim 1 wherein the said compound is α-hydroxy-gamma-methylmercapto butyric acid.

8. The poultry feed composition defined by claim 1 wherein the said compound is an ammonium salt of α-hydroxy-gamma-methylmercapto butyric acid.

9. The poultry feed composition defined by claim 1 wherein the said compound is a calcium salt of α-hydroxy-gamma-methylmercapto butyric acid.

10. The poultry feed composition defined by claim 1 wherein the said compound is a mixture of ammonium and calcium salts of α-hydroxy-gamma-methylmercapto butyric acid.

11. The poultry feed composition defined by claim 1 wherein the said compound is α-hydroxy-gamma-methylmercapto butyramide.

References Cited in the file of this patent

UNITED STATES PATENTS

| | | |
|---|---|---|
| 2,490,756 | Kenyon et al. | Dec. 6, 1949 |
| 2,623,824 | Goudry | Dec. 30, 1952 |
| 2,667,511 | Downing | Jan. 26, 1954 |

FOREIGN PATENTS

| | | |
|---|---|---|
| 257,403 | Switzerland | 1948 |

OTHER REFERENCES

Akobe, Chem. Abst. 31, col. 736 (1937).
Medes, Chem. Abst. 31, cols. 86, 55–6 (1937).